United States Patent [19]

Shigeta et al.

[11] 4,258,351
[45] Mar. 24, 1981

[54] SYSTEM FOR COLLECTION AND TRANSMISSION OF ROAD TRAFFIC INFORMATION

[75] Inventors: Kiyoko Shigeta; Shuntetsu Matsumoto, both of Kodaira; Naotake Ooyama, Kanagawa; Takashi Imai, Tokyo, all of Japan

[73] Assignees: Agency of Industrial Science & Technology; Ministry of International Trade & Industry, both of Tokyo, Japan

[21] Appl. No.: 962,694

[22] Filed: Nov. 21, 1978

[30] Foreign Application Priority Data

Nov. 26, 1977 [JP] Japan .................................. 52/142036

[51] Int. Cl.³ ........................ G08G 1/04; G08B 13/18
[52] U.S. Cl. .................................. 340/38 P; 250/578; 340/556
[58] Field of Search ................... 340/38 P, 38 R, 555, 340/556, 570, 38 S, 38 L; 324/175, 178; 250/559, 578, 202; 235/92 TC

[56] References Cited

U.S. PATENT DOCUMENTS

| | | | |
|---|---|---|---|
| 3,341,848 | 9/1967 | Niediek | 340/38 S |
| 3,381,219 | 4/1968 | Dumbeck | 340/38 P |
| 3,506,809 | 4/1970 | Pallat | 340/38 R |
| 3,889,117 | 6/1975 | Shaw, Jr. | 250/578 |
| 3,965,430 | 6/1976 | Brandt | 324/175 |
| 3,972,021 | 7/1976 | Leitz | 340/38 P |
| 4,041,293 | 8/1977 | Kihlberg | 324/175 |

OTHER PUBLICATIONS

IEEE Transactions on Vehicular Technology, "Electromagnetic Loop Vehicle Detectors", Anderson, vol. VT-19, No. 1, Feb. 1970, pp. 23-29.
IEEE Transactions on Vehicular Technology, "Radar, Acoustic, and Magnetic Vehicle Detectors", Barker, vol. VT-19, No. 1, Feb. 1970, pp. 30-43.

Primary Examiner—James J. Groody
Attorney, Agent, or Firm—Oblon, Fisher, Spivak, McClelland & Maier

[57] ABSTRACT

The system for collection and transmission of road traffic information comprises a lens system installed on a tall structure such as on the roof of a building and angled vertically or diagonally to include in its field of view a road area subjected to observation and a plurality of photoelectric conversion elements disposed on the focal plane of the lens system along the image of the road area to be formed on the focal plane. The plurality of photoelectric conversion elements are formed in shapes successively decreased in width and length in conformity with the perspective view of the road area formed on the focal plane of the lens system. This system operates on the principle that when a vehicle enters the road area under observation by this system, it causes a change in the brightness of the image of the road area formed on the focal plane of the lens system, the changed brightness of the image induces a corresponding change in the outputs of the photoelectric conversion elements, and the resultant change in the outputs on being processed by scanning gives rise to a series of pulse signals, which are transmitted to a traffic control center.

5 Claims, 39 Drawing Figures white  red  road  white gray  convertible  black

PHOTOELECTRIC CONVERSION ELEMENT

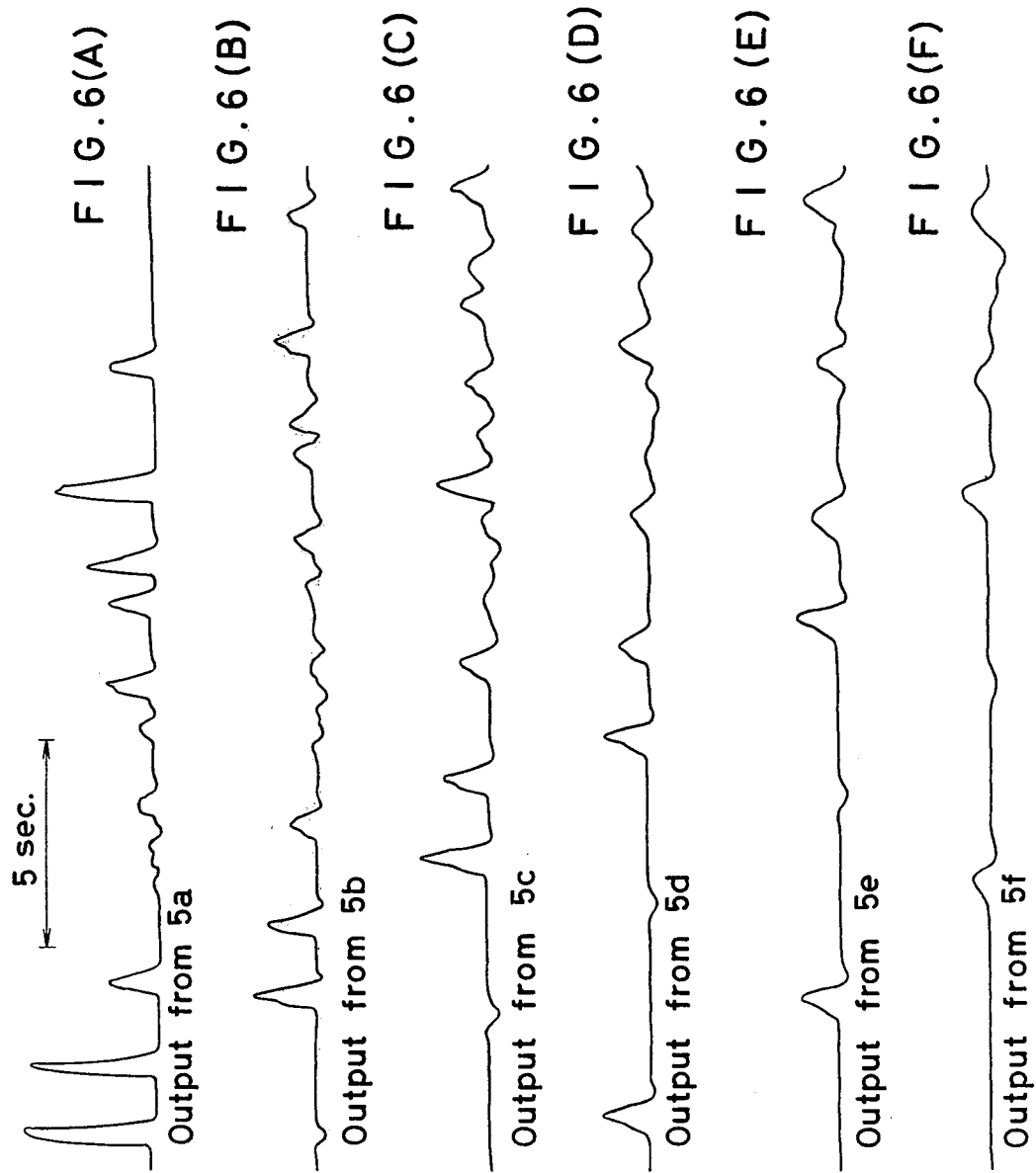

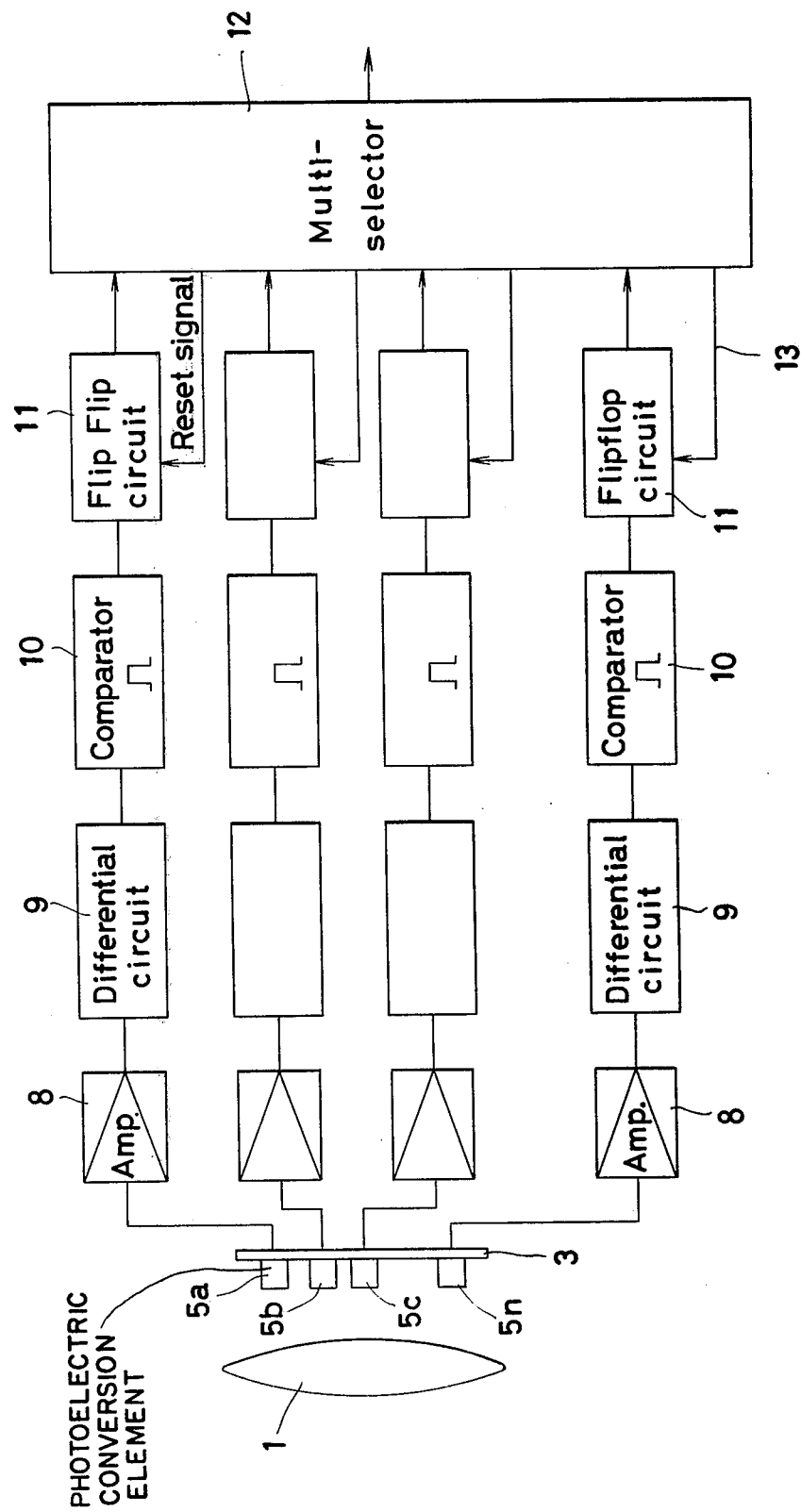

SYSTEM FOR COLLECTION AND TRANSMISSION OF ROAD TRAFFIC INFORMATION

BACKGROUND OF THE INVENTION

This invention relates to a system for the collection and transmission of road traffic information.

In the control of vehicular traffic on roads by the on-line traffic signal control system, provision of the information on traffic volume as input data is an indispensable requirement. This information changes minute by minute.

Heretofore, vehicle detecting devices such as the ultrasonic system and the loop system have been buried under road surfaces of traffic lanes near intersections or installed aerially above such road surfaces and used for measuring the traffic volume of vehicles passing through these intersections, spatial and chronological vehicular occupancy of roads and duration of traffic congestion, and the results of the measurement have been utilized as the information on road traffic (IEEE TRANSACTIONS ON VEHICULAR TECHNOLOGY, Vol VT 19, No. 1, Feb. 1970, for example). The detection area covered by each vehicular detecting device is limited to only several square meters. In the case of a road containing a plurality of traffic lanes, therefore, there must be installed one detecting device for each of the lanes. To make the matter worse, the cost required for the installation of each detecting device is relatively high. For this reason, an attempt to use these devices to obtain accurate spatial traffic information on all the road areas centering around an intersection requires an enormous expenditure. If the number of these devices so distributed in all the lanes is decreased to lower the expense, it is no longer possible to obtain accurate traffic information.

An object of this invention is to provide a system for the collection and transmission of traffic information, which system is capable of accurately measuring the flow of vehicles on sections of roads 300 to 500 meters in length, for example.

Another object of this invention is to provide a system for the collection and transmission of traffic information, which system is capable of counting the number of vehicles passing a specific area of the road.

Still another object of this invention is to provide a system for the collection and transmission of traffic information, which system is capable of measuring speeds of vehicles passing a specific area of the road.

A further object of this invention is to provide a system for the collection and transmission of traffic information, which system is capable of readily transmitting the traffic information to be collected.

SUMMARY OF THE INVENTION

To accomplish the objects described above according to the present invention, there is provided a system for the collection and transmission of traffic information, which system comprises a lens system installed on a tall structure and angled vertically or diagonally to include in its field of view a large road area selected for the collection of traffic information and a plurality of photoelectric conversion elements disposed on the focal plane of the lens system along the image of the road area to be formed on the focal plane and which system operates on the principle that when a vehicle enters the road area under observation by the present system, it causes a change in the brightness of the image of the road area formed in the focal plane of the lens system, the changed brightness of the image induces a corresponding change in the electric signals issuing from the photoelectric conversion elements, the changed electric signals are converted into pulse signals. By this conversion, it is possible to detect whether vehicles are present in the road area. Accordingly, it is possible not only to obtain traffic information to a large extent from the pulse signal issued from each photoelectric conversion element but also to transmit traffic information to the traffic control center through a telephone line by converting the pulse signal issued from each photoelectric conversion element into a series of pulse signals by means of scanning.

This invention, owing to its construction as described above, does not require direct installation of detecting devices in the road. The system of this invention, therefore, is economical and is capable of readily providing necessary traffic information on the roads in a given area. Moreover, the photoelectric conversion elements used in this system, are less than 1 mm in length, and are sensitive enough to detect, with high accuracy, changes which occur in the brightness of the road area as the object of the lens system at a distance of even 500 meters. From a single point of observation, this system permits collection of road traffic information on roads over a large area. Further, since the output signals from the individual photoelectric conversion elements are converted by scanning into a series of pulse signals, the traffic information collected by this system can be transmitted by use of a telephone line.

The system can also be utilized for counting the number of vehicles passing a given point or for measuring speeds of moving vehicles by properly modifying the arrangement of individual photoelectric conversion elements or the processing of the output signals issuing from such elements.

The other objects and characteristic features of the present invention will become apparent from a detailed description to be given hereinafter with reference to the accompanying drawing.

BRIEF EXPLANATION OF THE DRAWING

FIG. 1 is an explanatory diagram illustrating the principle underlying the system of this invention for the collection and transmission of traffic information.

FIG. 2 is an explanatory diagram illustrating the focal plane of the lens system and the arrangement of the group of photoelectric conversion elements in the system of the present invention.

FIGS. 6(A) through 6(F) are a set of wave-form diagrams illustrating typical output signals issuing from the group of photoelectric conversion elements in the system of the present invention.

FIG. 15 is a diagram illustrating a processing circuit for transmitting to a traffic control center the pulse signal into which the output signal issued from each of a plurality of photoelectric conversion elements is converted.

DESCRIPTION OF THE PREFERRED EMBODIMENT

Figure 5:
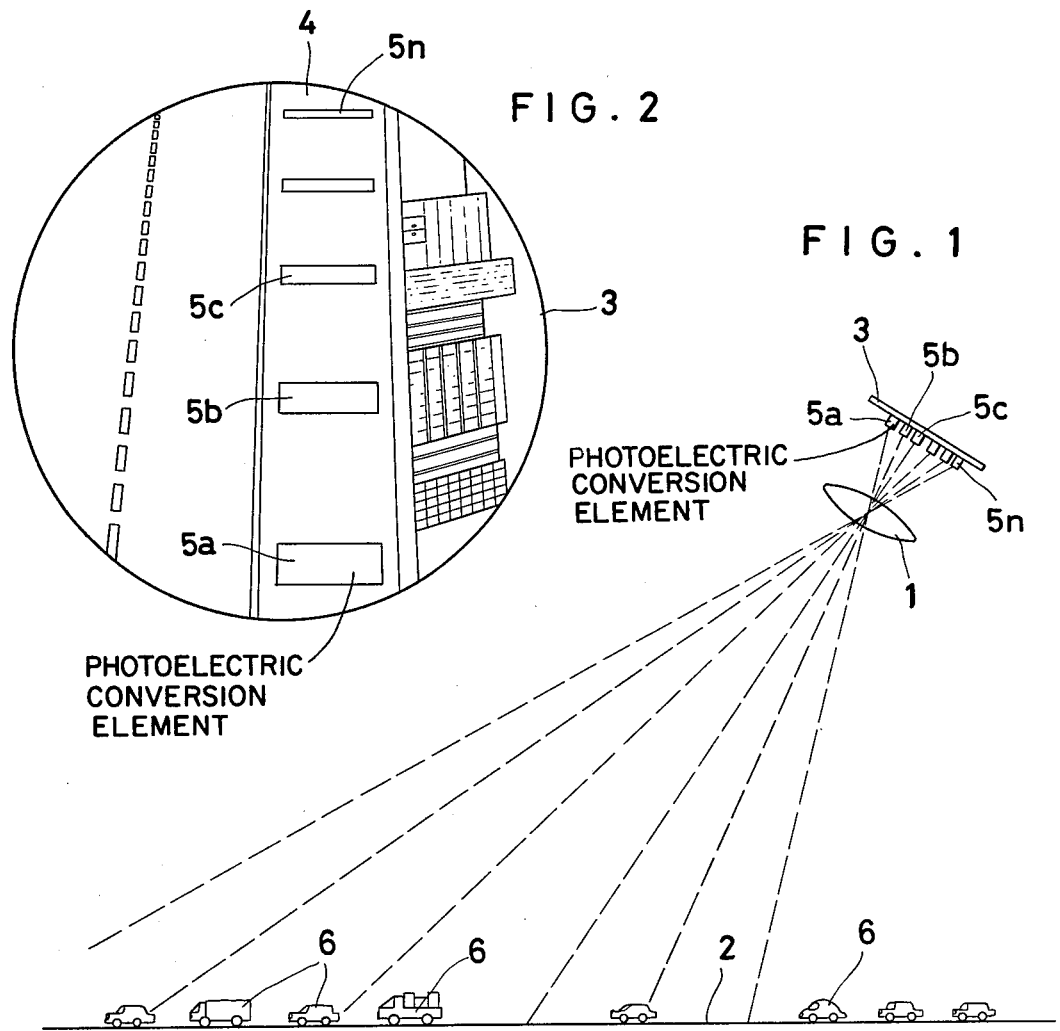
FIG. 5 is a wave-form diagram illustrating the relation between the output wave forms from the photoelectric conversion elements and the colors of vehicles observed in the system of the present invention.

With reference to FIG. 1, the lens system 1 is installed on a structure (not shown) such as a building, an overpass or an electric pole tall enough for the lens system 1 to be angled vertically or diagonally to include in its field of view the entire area of road 2 selected for collection of traffic information. A plurality of photoelectric conversion elements 5a, 5b, 5c, ... 5n are disposed on the focal plane 3 of the lens system 1 in the direction in which the images of the vehicles advance along the traffic lane under observation in the image of road area 4 formed on the focal plane 3. This arrangement of the group of photoelectric conversion elements brings about the same effect as is obtained by having such elements installed at corresponding portions in the road area under observation. When a vehicle 6 enters one of the portions of the road area corresponding to the positions at which the elements would have been installed, since the brightness of the vehicle 6 and that of the road surface 2 differ, this difference in brightness causes a change in the brightness of the image of that portion formed in the focal plane of the lens system and this change in the image brightness induces a corresponding change in the output signals of the photoelectric conversion elements 5a, 5b, 5c, ... 5n on the focal plane 3 of the lens system 1.

Since the lens system 1 and the group of photoelectric conversion elements 5a, 5b, 5c, ... 5n mentioned above are installed at a relatively high place 30 meters above the ground level, for example, so as to ensure collection of traffic information within a desirably large road area, the image of the road area to be formed on the focal plane of the lens system is a kind of perspective view of that road area. If the individual photoelectric conversion elements to be disposed on the focal plane are formed in trapezoidal shapes of successively decreasing sizes so as to conform to the corresponding portions of the perspective image of the road area formed on the focal plane, then the dimensions of the road portions to be kept under observation by the individual photoelectric conversion elements are substantially uniform.

Since this conformity of the individual photoelectric elements with the corresponding object road portions is not required to be very exact from the practical point of view, therefore, it suffices for the purpose of this invention to arrange, on the focal plane of the lens system, photoelectric conversion elements of the shape of slits of gradually decreasing widths along the image of road formed on the plane and to cover the focal plane other than the part corresponding to the traffic lane to be observed with a mask impervious to light.

In the case of a road containing in its half width a plurality of traffic lanes for vehicles travelling in one direction, if the traffic information to be collected is required to cover all the lanes in that half width, it suffices to have as many groups of photoelectric conversion elements as there are traffic lanes disposed in the corresponding images of traffic lanes formed on the focal plane in the direction of the travel of vehicles.

These photoelectric conversion elements are manufactured by forming on a proper substrate a thin film of a known photoelectric conversion substance such as, for example, silicon wafer and etching the resultant composite by the photo-etching technique to dimensions determined in due consideration of the relative position of the element on the focal plane, the type of information to be collected, etc.

Figure 3:
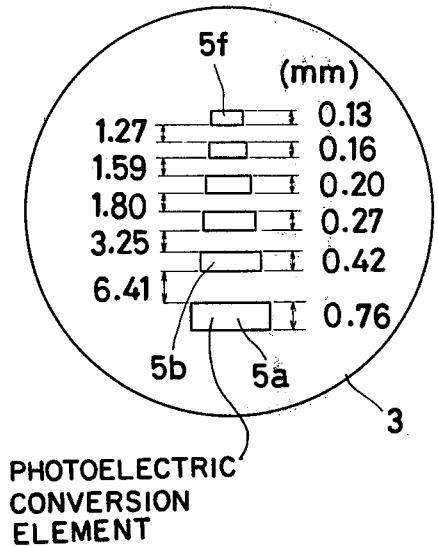
FIG. 3 is an explanatory diagram illustrating a typical arrangement of the group of photoelectric conversion elements in the focal plane of the lens system involved in the system of the present invention.

For example, six such conversion elements can be formed by depositing a silicon wafer on a substrate and etching the composite to sizes such as are indicated in FIG. 3. When this group of photoelectric conversion elements 5a, 5b, ... 5f is installed at a height of about 30 meters above the ground level and a lens with a focal length of 50 mm is disposed so as to have these elements completely included in its focal plane and to allow the image of a road area to be formed on this plane, the elements serve the purpose of keeping under observation the portions of the road 2 as demarcated in FIG. 4. To be specific, the element 5a keeps observation upon a road portion about 3.1 meters in length and about 2.0 meters in width at a distance of about 71.7 meters from the position 7 which is a point of intersection between a perpendicular line drawn from the group of elements and the surface of the road; the element 5b, a road portion about 4.1 meters in length and about 2.0 meters in width at a distance of about 115.4 meters from the position 7; and the element 5f, a road portion about 8.6 meters in length and about 2.0 meters in width at a distance of 314.7 meters from the position 7.

These groups of photoelectric conversion elements are arranged so that the images of specific road areas from which traffic information is to be collected may be formed on the focal planes incorporating the groups of elements mentioned above. When a vehicle enters one of the road portions kept under observation by the photoelectric conversion elements, the image of this vehicle is formed on the corresponding element and, because of this change of the image formed on the element, the output signals issuing from that particular element in conformity with the brightness of the road portion change to those conforming with the brightness of the vehicle. This change of the output signals is determined by the shape, color, gloss and traveling speed of the vehicle, the condition of illumination, and other factors.

Typical wave forms of the outputs of the photoelectric conversion elements during the daytime on a clear day are shown in FIG. 5 by way of illustration. From this waveform, it is seen that a tall wave form is obtained as an output when a white vehicle passes the road portion and an output of a short wave form is obtained when a black vehicle or a convertible which has a lower reflection index than the road surface passes the road portion. It is noted that two peaks appear in the wave form of the output of the element when a white vehicle passes the road portion. This is possibly because the element is positioned above the road level and posterior to the vehicle and, consequently, the reflection of light first from the roof of the vehicle affects the output, the reflection then from the rear window is weak and does not affect the output so much and the reflection finally from the trunk lid again affects the output. The system is installed in such a way as to observe passing vehicles from behind in due consideration of the advantage that the lights from the tail lamps of the vehicles during the night hours can be utilized for the detection of changes in the outputs of the photoelectric conversion elements.

When a plurality of photoelectric conversion elements are disposed at predetermined intervals on the image of the road area formed on the focal plane of the lens system, smooth travel of a vehicle through the road area under observation results in the successive appearance of substantially similar changes in the wave forms of the output signals of the successive elements with a lag proportionate to the speed of the vehicle.

Figure 4:
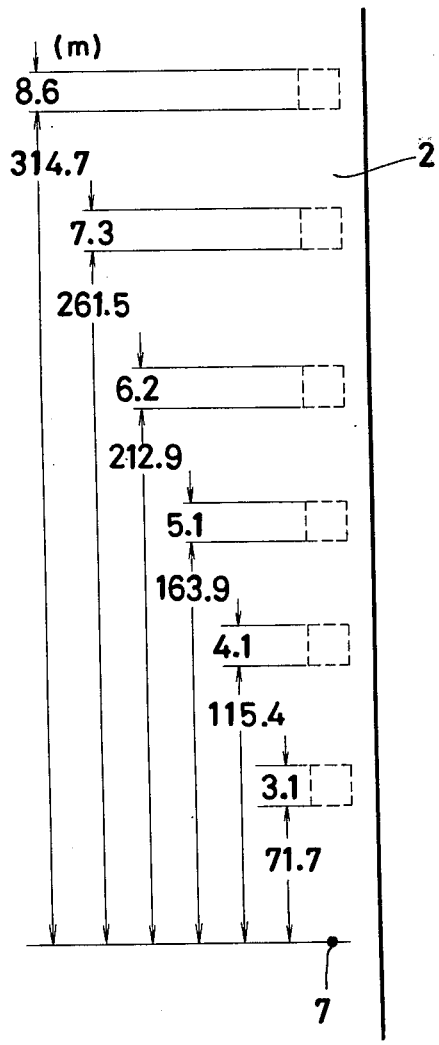
FIG. 4 is an explanatory diagram illustrating the portions of the road area as the objects of detection by the individual elements arranged as illustrated in FIG. 3 in the system of the present invention.

The wave forms shown in FIG. 6 are those of the output signals issuing from the group of elements of FIG. 3 in the twilight. When a vehicle travels through the road area kept under observation by the group of the elements in the evening, the light from the tail lamp of this vehicle is focussed successively on these elements, causing similar successive changes in the wave forms of the output signals from the elements. In FIG. 6, the wave form of the output signal from the element 5a is substantially similar to that of the output signal issued from the element 5b with a lag of about 4 seconds and this relationship applies to the output signals from the remaining elements. Since the road portions under the observation of the elements 5a and 5b are separated by a distance of about 43.7 meters as shown in FIG. 4, the lag of about 4 seconds in the appearance of changes in the wave forms of the output signals from the two elements indicates that the vehicle is traveling at a speed of about 39 km/hour.

Figure 7:
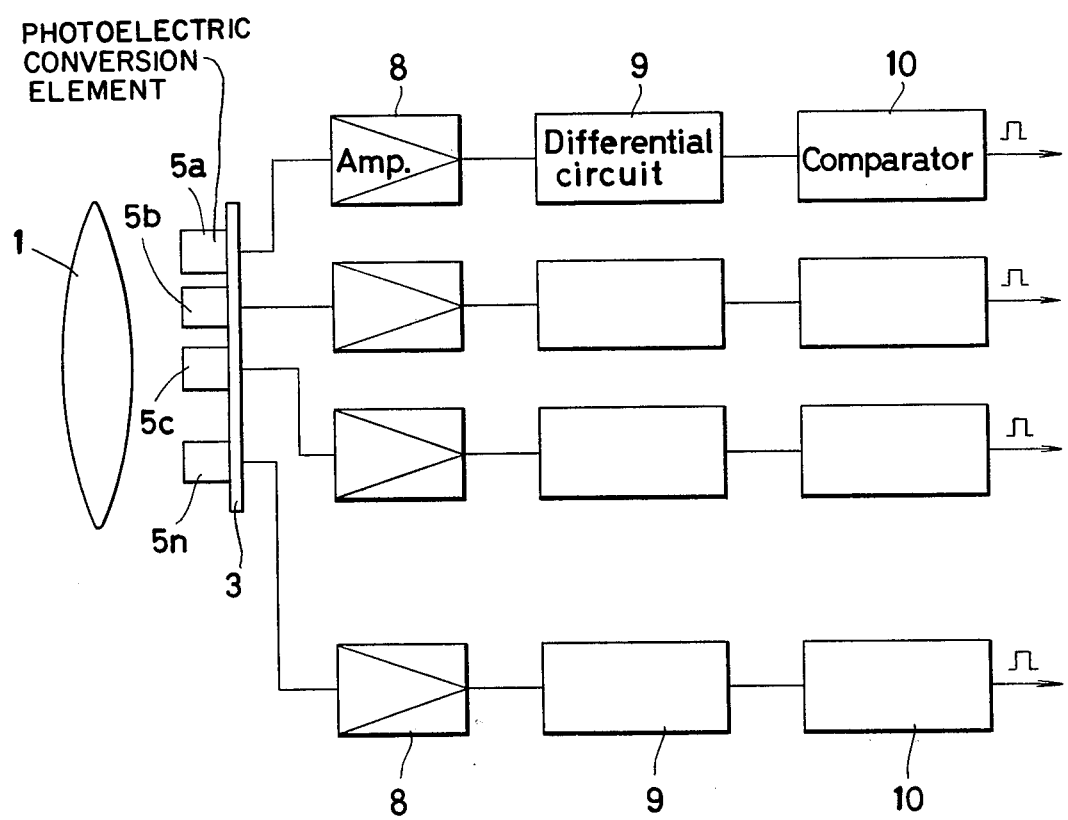
FIG. 7 is a diagram illustrating a typical circuit for processing the output signals issuing from the photoelectric conversion elements in the system of the present invention.

FIG. 7 illustrates a fundamental circuit adapted to process the output signals from the photoelectric conversion elements 5a, 5b, 5c, . . . 5n.

Figure 8A:
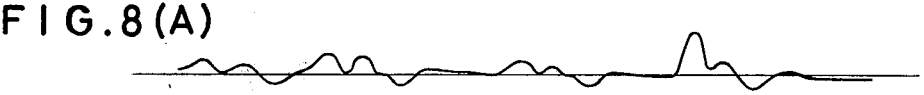
FIGS. 8(A) through 8(C) are a set of wave-form diagrams representing the various stages in which the output signals are processed in the circuit of FIG. 7.
Figure 8B:
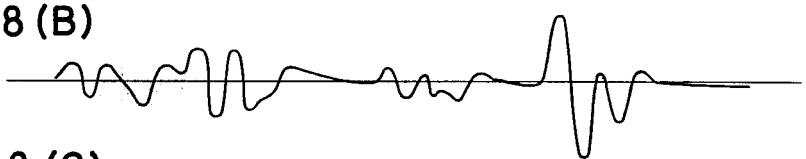
Figure 8C:

The electric signal issued by each of these photo-electric conversion elements (FIG. 8(A)) is amplified in the amplifier 8 and then applied to the differential circuit 9. In the differential circuit 9, the amplified electric signal is converted into a differential wave form as illustrated in FIG. 8(B). In the subsequent comparator 10, the differential wave signal is compared with a fixed level and shaped into a pulse signal as illustrated in FIG. 8(C). Thus, the state wherein vehicles pass through the road area under observation can be known from the pulse signal issuing from the comparator 10.

Adoption of the system of this invention for counting the number of vehicles passing such specific road points will be described with reference to FIGS. 9 and 10.

As already described, when a vehicle passes through the road portions kept under observation by the photoelectric conversion elements 5a, 5b, 5c, . . . 5n disposed on the images of road portions formed on the focal plane 3 of the lens system 1, the electric signals issued by these photoelectric conversion elements are changed. FIG. 10(A) shows the wave form of an electric signal issued over a certain duration of time by one of the elements. When the electric signal is amplified by the amplifier 14 and then differentiated by the differential circuit 15 illustrated in FIG. 9, there is obtained a differential signal of the wave form shown in FIG. 10(B). When the differential signal is inverted in polarity by the polarity-inversion circuit 16, there is obtained a differential signal of the opposite polarity having the wave form of FIG. 10(C).

Figure 10A:
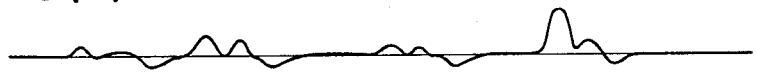
FIGS. 10(A) through 10(H) are a set of wave-form diagrams representing the various stages in which the output signals are processed in the processing circuit of FIG. 9.
Figure 10B:
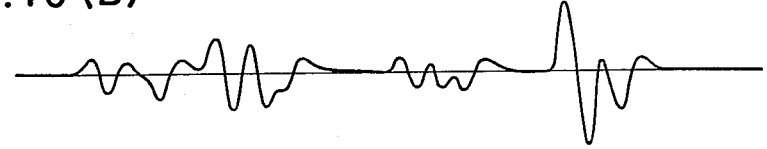
Figure 10C:
Figure 10D:
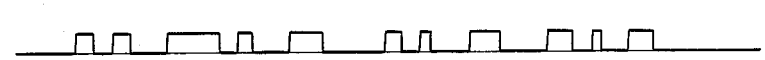
Figure 10E:

When these differential signals of the wave forms of FIGS. 10(B) and 10(C) are processed by the comparators 17, 18 respectively, the portions above the zero levels are converted into corresponding rectangular wave forms, giving rise to the signals of rectangular wave forms of FIGS. 10(D) and 10(E) respectively. Then, the two sets of signals of rectangular wave forms are synthesized by the logical sum circuit 19 to produce a signal of a rectangular wave form as shown in FIG. 10(F).

In the electric signal of the rectangular wave form thus obtained, the time intervals which are produced between the individual rectangular waves in accordance with changes in brightness at different parts of one vehicle are not the same as the time intervals which are produced between the individual rectangular waves in accordance with time intervals between a plurality of vehicles passing the road portion. The time intervals between the individual rectangular waves are decisively larger in the latter case. In the latter case, therefore, time intervals greater than a fixed size are interposed between the individual rectangular waves in the rectangular wave form of FIG. 10(F). By taking count of those time intervals, therefore, the number of vehicles passing a given road portion can be found.

For the counting of passing vehicles through detection of the aforementioned time intervals, it suffices to fix the lower limit of the time interval at about 0.5 second because the flow of vehicles generally occurs at the rate of one vehicle per about two seconds.

Figure 9:
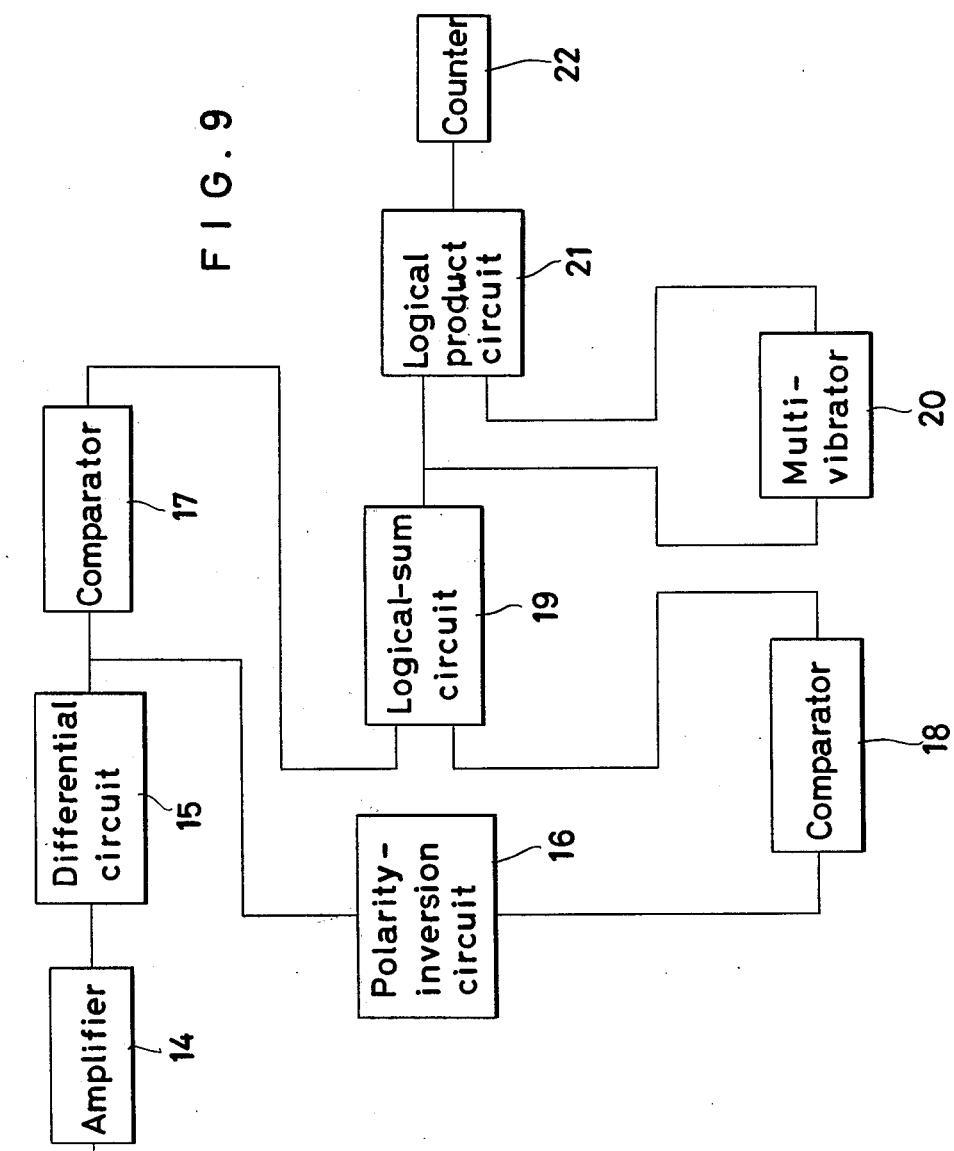
FIG. 9 is a diagram illustrating a processing circuit for counting the number of passing vehicles on the basis of the output signals issuing from the photoelectric conversion elements in the system of the present invention.
Figure 10F:
Figure 10G:
Figure 10H:

The retention time of the one-shot multi-vibrator 20 of FIG. 9 is fixed at 0.5 second, for example, and the individual rectangular waves of the signal of rectangular wave form (FIG. 10(F)) issuing from the logical sum circuit 19 are checked to determine whether or not any impulse signal occurs within 0.5 second following the termination of any of the rectangular waves. Therefore, there is obtained a signal of the wave form of FIG. 10(G). Individual rectangular waves in this signal have a pulse width of 0.5 second. When the signal of rectangular waves having a pulse width of 0.5 second is inverted in polarity and, the inverted signal and the signal from the logical sum circuit 19 are processed by a logical product circuit 21 of FIG. 9. A signal having rectangular waves illustrated in FIG. 10(H) is consequently obtained. The number of rectangular waves in the signal obtained from the logical product circuit 21 indicates the number of vehicles. By applying this signal to the counter 22 to take count of the rectangular waves in the signal, the number of passing vehicles (3 in the case of the signals of FIG. 10) can be found.

When the processing of information by the processing circuit of the principle described above is performed on the output signals from the photoelectric conversion elements 5a, 5b, 5c, ... 5n in all the groups involved, the number of vehicles passing the respective road portion can be simultaneously found.

If the angle of the focal plane 3 of the photoelectric conversion elements to the vertical line drawn to the road surface is increased, the time intervals between the individual waves of the signal of wave form of FIG. 10(F) are decreased and there is an increased possibility of erroneous measurement. This possibility of erroneous measurement can be prevented by installing the lens system 1 and the photoelectric conversion elements at a position such that the road portions to be placed under the observation by the focal plane 3 fall below the system and, consequently, the distances between the vehicles traveling through the road portions can be detected with added accuracy.

Now, use of the system of this invention for the measurement of speeds of vehicles passing the road area will be described with reference to FIGS. 11–13.

Figure 11:
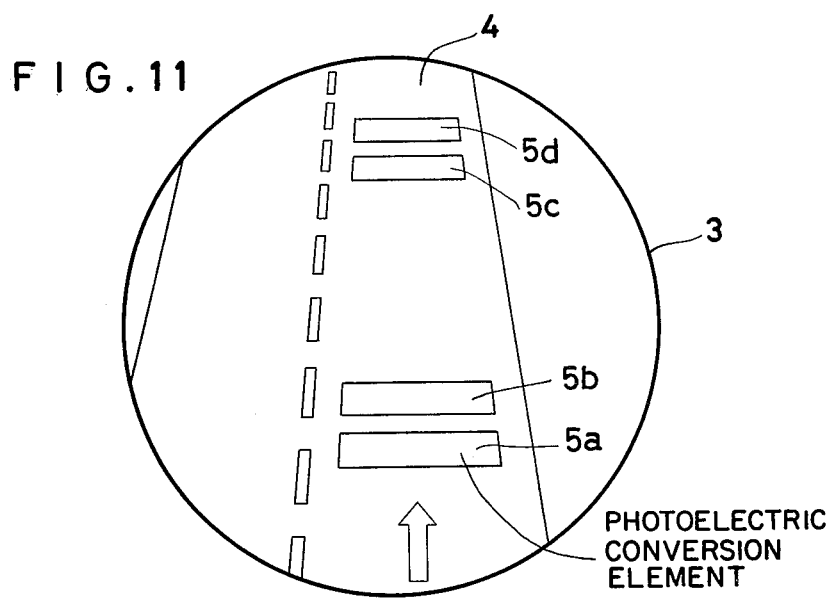
FIG. 11 is an explanatory diagram illustrating the arrangement of photoelectric conversion elements for measuring the speeds of moving vehicles in the system of the present invention.

Two groups each of two photoelectric conversion elements, 5a and 5b in one group and 5c and 5d in another, are disposed at a prescribed distance along the traffic lane in the image 4 of the road area formed in the focal plane 3 of the lens system 1 as shown in FIG. 11. The distance between the starting edge of the road portion being observed by one of the two photoelectric conversion elements of one group and the starting edge of the road portion being observed by the remaining element must be smaller than the minimum space wavelength of the image signals of a vehicle generated by these elements. This distance is generally on the order of from two to three meters on the road surface, although it is variable to some extent with the length of the road portion under observation in the direction of the travel of vehicles on the lane.

The road portions being observed by the two photoelectric conversion elements of one group are set in advance on the road as described above. This distance between the two starting edges of the two elements in the one group can easily be determined on the basis of the distance from the road surface to the lens system, the angle of the system, the focal length of the lens system, and the positions of the elements disposed on the image of the road area formed on the focal plane of the lens system.

When a vehicle passes the road area, the photoelectric conversion elements issue electric signals in conformity with the shape, color and condition of illumination of the vehicle. For example, an electric signal of the wave form of FIG. 13(A) is obtained from the element 5a and an electric signal of the wave form of FIG. 13(B) from the element 5b.

Figure 13A:
FIGS. 13(A) through 13(G) are a set of wave-form diagrams representing the stages in which the output signals are processed in the processing circuit of FIG. 12.
Figure 13B:
Figure 13C:
Figure 13D:
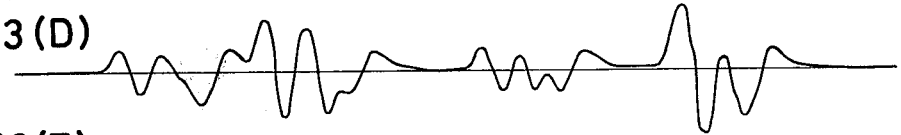
Figure 13E:
Figure 13F:
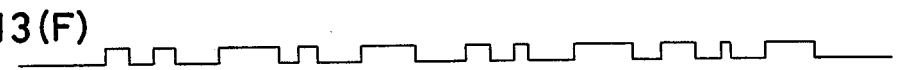
Figure 13G:

Comparison of the two electric signals indicates that the wave form of the signal of FIG. 13(B) occurs with some time lag determinable by the traveling speed of the vehicle from that of FIG. 13(A). These electric signals are amplified by the amplifier 23a, 23b shown in FIG. 12. The amplified signals are applied to the differential circuits 24a, 24b to be converted into signals of differential wave forms as illustrated in FIGS. 13(C) and (D). These signals are then applied to the comparators 25a, 25b, wherein the waves above the zero level are shaped to a fixed size. Consequently, signals of rectangular wave forms of FIGS. 13(E) and (F) are obtained. When the signals of rectangular wave form of FIG. 13(E) as setting signals and those of FIG. 13(F) as resetting signals are applied to the set-reset type flipflop circuit 26, there is consequently obtained a signal of rectangular wave form of FIG. 13(G). The pulse width of this signal is in inverse proportion to the traveling speed of the vehicle.

Figure 13H:
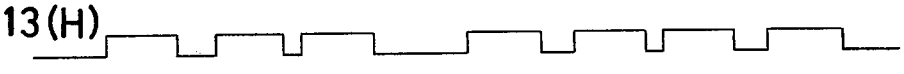
Figure 13I:
Figure 13J:

The signal of the wave form from the flipflop circuit 26 is applied to the one-shot multi-vibrator 27. In this multi-vibrator 27, there is produced a signal of rectangular wave form (FIG. 13(H)) containing rectangular waves having a fixed pulse width and starting from the starting points of the waves in the applied signal of rectangular wave form. The aforementioned pulse width is fixed in conformity with the lowest traveling speed of vehicles in motion on the road surface. By "lowest traveling speed" is meant the speed at which the vehicle may well be regarded as being stopped in consideration of the characteristics of the traffic flow of vehicles. Specifically, this lowest traveling speed is not more than about 5 km/hour. When the signal obtained by inverting the signal of rectangular wave form of FIG. 13(G) in polarity and the signal of rectangular wave form of FIG. 13(H) are applied to the logical product circuit 28, there is consequently obtained a signal of rectangular wave form containing pulse widths equalling differences between the corresponding pulse widths of the two signals as illustrated in FIG. 13(I). This signal of rectangular wave form is applied to the mode integrator 29, wherein each individual rectangular wave is integrated from the starting point to the terminating point and the value of integration is retained until it is reset upon occurrence of the next following rectangular wave and this operation is repeated on all the remaining rectangular waves involved. Consequently, there is produced a signal of DC voltage in direct proportion to the speeds of the traveling vehicles as illustrated in FIG. 13(J), namely a signal of DC voltage having peak values directly proportional to the pulse widths of the signal of rectangular wave form of FIG. 13(I). The speeds of vehicles passing the road area can continuously be recorded, therefore, by processing this signal of DC voltage by a low-pass filter 30 and applying the output to a recorder 31. The vehicular speed distribution in a given road aggregate can be obtained by arranging a plurality of sets of photoelectric conversion elements in such a way as to keep observation upon desired road areas, and simultaneously recording the speeds of vehicles passing the object road areas, using a multi-stylus recorder for the purpose of recording.

Figure 14:
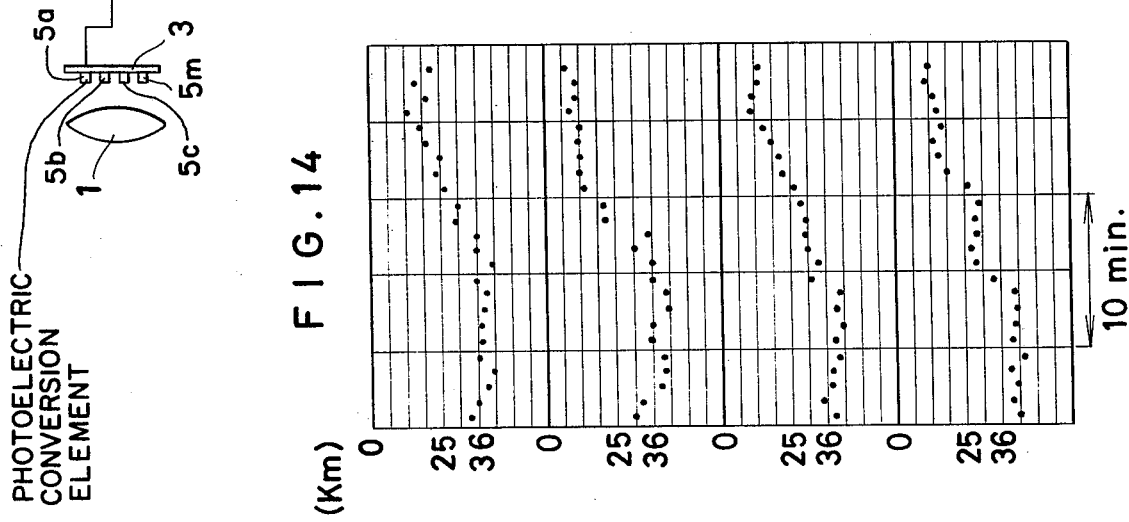
FIG. 14 is a graph showing data obtained on the speeds of traveling vehicles by the system of the present invention.

For example, FIG. 14 is a graph showing the speeds of vehicles passing the road area at intervals of about 50 m detected by use of four pairs of photoelectric conversion elements with the output from each pair of the elements scanned every one minute. The data of FIG. 14 show that the vehicles on this road first traveled at about 40 km/hour but that their speed was later reduced to about 15 km/hour as a result of congestion.

The pulse signal from each photoelectric conversion element may be forwarded to a memory unit (not shown), a display unit (not shown) or a traffic control center.

In the case of the pulse signal being forwarded to a traffic center, as illustrated in FIG. 15, it is applied to a buffer memory 11. When a change is present in the output signal of the photoelectric conversion element, the application of the shaped pulse signal causes the buffer memory 11 to switch from its originally reset state of "0" to the state "1" and remain in the state "1". When no change is present in the output signal of the photoelectric conversion element, the buffer memory 11 is allowed to retain its original state "0".

The buffer memory 11 is integrally disposed for each of the photoelectric conversion elements 5a, 5b, 5c, ... 5n and all the buffer memories 11 are parallelly arranged and collectively connected to the subsequent digital multi-selector 12. The multi-selector 12, by means of its own sampling signal, scans the output signals of the buffer memory 11 belonging respectively to the photoelectric conversion elements in a fixed order, for example, in the order of the buffer memories of the photoelectric conversion elements 5a, 5b, 5c, ... 5n or in the order of the buffer memories of the photoelectric conversion elements 5n, ... 5c, 5b and 5a and, on completion of the sampling, resets the buffer memories respectively into the state of "0" by its own reset signal (in the case of a buffer memory whose output signal happens to be in the state of "0", this resetting results in the restart of this state "0"). In the intervals between the sampling operations performed by the multi-selector 12, the system continues to observe the road area for changes in brightness. The series of actions described above repeats itself.

In the manner described, the multi-selector 12 periodically scans in a fixed order the output signals of the buffer memories which have memorized changes in the electric signals issued respectively by the photoelectric conversion elements 5a, 5b, 5c, ... 5n and, consequently, gives rise to a series of pulse signals. Thus, the traffic information thus produced in the form of series of pulse signals can easily be transmitted to a traffic control center or the like by use of a low-baud telephone line, for example.

The amplifiers, differential circuits, comparators, buffer memories, etc. to be used in the processing circuit of this invention can in all cases be types known to the art. As the digital multi-selector 12, any of the selectors SN 54/74150, 74151 or 74152 made by Texas Instruments Inc. can be used in this system.

The length of the sampling cycle of this multi-selector is determined by the exactness of the traffic information and a transfer rate of a telephone line used in transmittance. In detecting common traffic circumstances, since a fivesecond sampling cycle affords much more detailed traffic information, a telephone line of about 50 baud can effectively be used. Accordingly, traffic information is sufficiently transmitted at a low cost.

Figure 12:
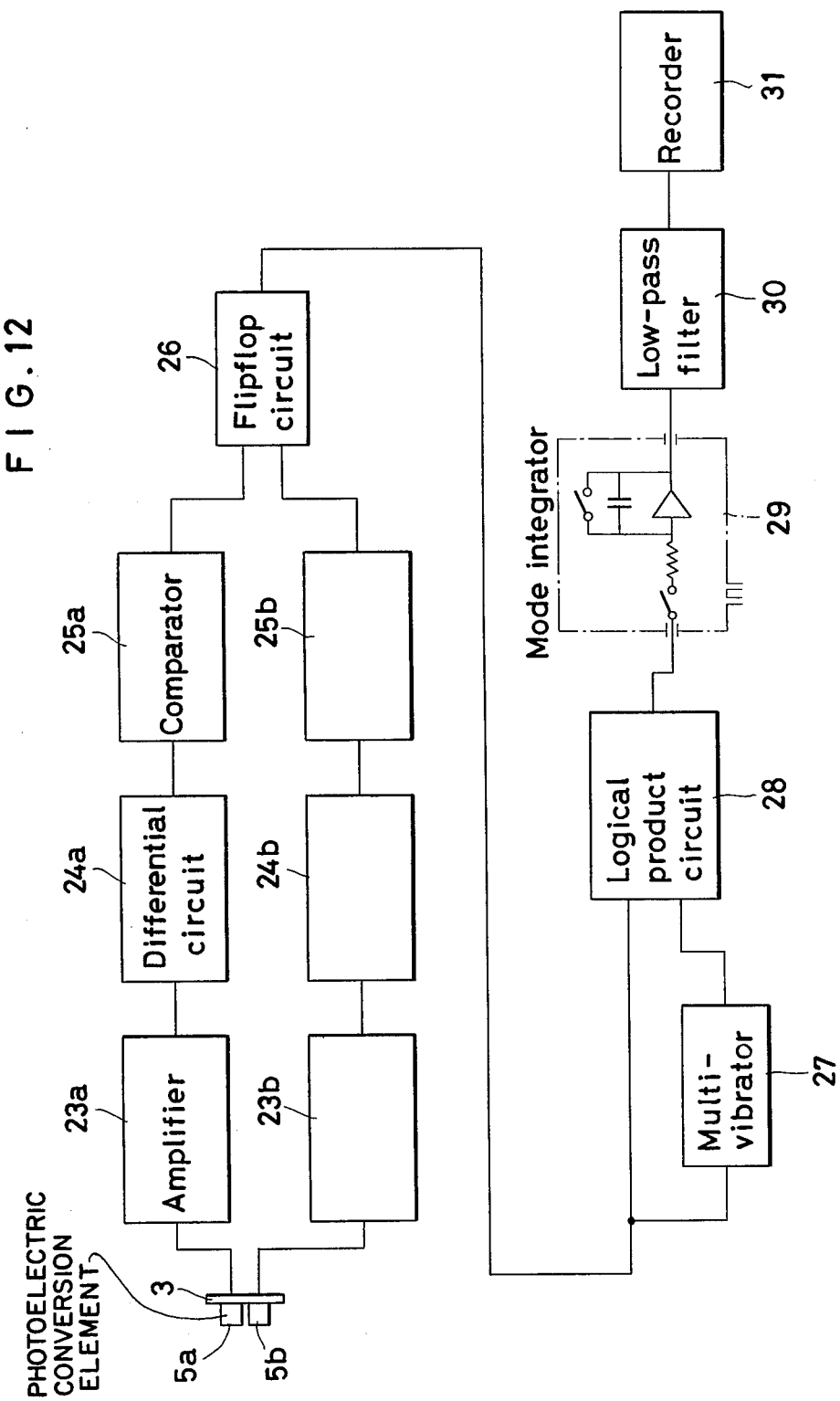
FIG. 12 is a diagram illustrating a processing circuit for measuring the speeds of moving vehicles on the basis of the output signals issuing from the photoelectric conversion elements of FIG. 11.

In the case of transmitting information on the number of vehicles to the traffic control center as shown in FIG. 9, the pulse signal issuing from the logical product circuit 21 is forwarded to the buffer memory, whereas in the case of the transmission of information on the speed of vehicles as shown in FIG. 12, the pulse signal issuing from the logical product circuit 28 is forwarded via a gate (not shown) to the buffer memory. In either case, the pulse signal forwarded to the buffer memory is converted into a series of pulse signals by the multi-selector and then forwarded to the traffic control center.

In the actual measurement of traffic flow by the system of the present invention, changes in brightness in the road portions under the observation of the photoelectric conversion elements are caused by numerous factors. Examples are changes in sunlight occurring daily through the stages of sunrise, daytime, sunset and night; changes in the quantity of the light due to interception of rays of sunlight by clouds; changes due to flickering lights of blinkers and brake lamps; changes due to glowing lights of tail lamps, small lamps and head lamps; and changes in the surface reflections of sunlight, moonlight and illuminating lights on vehicles in motion. Changes in brightness which are ascribable to changes in sunlight occurring daily, changes in the quantity of the light and changes due to flickering lights of blinkers and brake lamps and those which are ascribable to changes in the surface reflections of light on vehicles traveling at varying speeds from several kilometers to several tens of kilometers per hour, making stops and starts such as at traffic signals and changes in glowing lights of tail lamps, small lamps and head lamps are widely different in terms of amount and cycle of variation and other similar characteristics. For this reason, the output signals of the photoelectric conversion elements are amplified and subsequently converted in the differential circuits into differential wave forms and further processed in the comparators to be freed from those changes due to the causes of the former group as much as possible.

Further, the series of pulse signals which have been forwarded from the multi-selector to an electronic computer at the traffic control center are subjected to multilateral analysis so as to be freed from the effects of those changes in brightness caused by changes in sunlight, changes in the quantity of the light and changes in flickering lights of winkers and brake lamps. In this way there is accomplished selective extraction of changes in brightness purely ascribable to the behavior of vehicles in the road area under observation, giving rise to neat information suitable for processing with the on-line traffic signal control system at the traffic control center. At the control center, the control system clocks this neat information, compares it with the pulse signals of the immediately preceding and following cycles, and makes proper judgment. If a pulse signal representing the state of "0" is received by the control system at night or at a very early part of the morning, for example, the judgment is that no vehicle is present in the road area under the observation of the relevant photoelectric conversion elements. Such a pulse signal representing the state of "0" is also received when, owing to traffic congestion, vehicles present within the object road area under the observation of the system are forced to stand still. Generally traffic congestion originates in the neighborhood of an intersection and gradually extends backward with reference to the direction of the traffic flow. The spatial condition of such congestion in the traffic flow, therefore, can be rather simply measured by comparing the time-course change of output voltage from photoelectric conversion elements maintaining observation of a road area close to the intersection with that of the output voltage from photoelectric conversion elements maintaining observation upon a road area separated from the intersection.

Such measurement of the congestion of traffic flow necessitates memorization of the relevant output voltages from the aforementioned photoelectric conversion elements for a suitable duration of time (from several seconds to several minutes). This memorization is accomplished by converting these output voltages into digital signals by means of an A-D converter and subsequently storing the digital signals in the computer memory.

According to the present invention, the presence or absence of changes in brightness at numerous portions of a large road surface can be simultaneously determined by a plurality of photoelectric conversion elements maintaining observation of the portions mentioned above and the results of the determination can be converted into time-course a series of pulse signals, which are capable of being transmitted via a telephone line to the traffic control center. At the traffic control center, therefore, the information on changes of brightness received in the form of a series of pulse signals can be analyzed multilaterally and then processed by the electronic computer, permitting the remote center to form an estimate of the condition of traffic flow (such as degree of traffic congestion and traffic density per unit time) on the specific portions distributed over some hundreds of meters of road. The results thus obtained can be utilized as input data for an on-line traffic signal control system.

Figure 16:
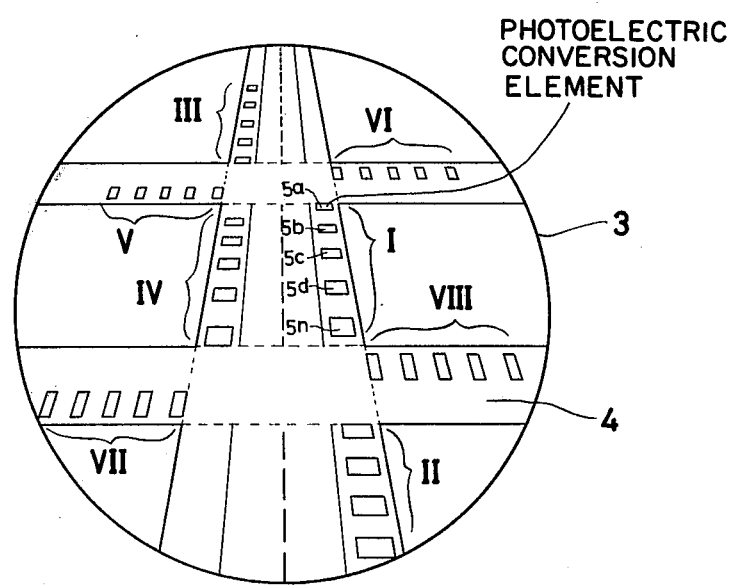
FIG. 16 is an explanatory diagram illustrating another embodiment of the system of this invention for the collection and transmission of traffic information.

In the case where the image of a road aggregate formed on one focal plane of the lens system contains a plurality of areas necessitating measurement by the system of this invention, groups each comprised of photoelectric conversion elements $5a$, $5b$, $5c$, ... $5n$ formed similarly in successively decreasing shapes and separated so as to conform with the respective perspective images of the relevant object road portions may be installed one each for the road areas to be monitored as shown in FIG. 16. In this arrangement, required traffic information can be collected and transmitted by scanning, in the respective multi-selectors, the output signals from the photoelectric conversion elements $5a$, $5b$, $5c$, ... $5n$ of Group I and Group II, those of Group III and Group IV, those of Group V and Group VI, and those of Group VII and Group VIII covering all of the road portions or required ones of the road portions in single traffic lanes or the equivalent output signals from the photoelectric conversion elements $5a$, $5b$, $5c$, ... $5n$ of Group I and Group III, those of Group II and Group IV, those of Group V and Group VI and those of Group VII and Group VIII.

The system of the present invention can further be utilized for counting the number of vehicles passing specific points in the road area or for detecting speeds of such vehicles in motion by suitably modifying the arrangement of the photoelectric conversion elements in the image of the road area on the focal plane of the lens system or by modifying the method for the processing of electric signals issued by such photoelectric conversion elements.

As described above, this invention accomplishes its objects simply by disposing a lens system at a position at which the lens system can be angled so as to include in its focal plane a road area selected for the purpose of collection of traffic information and arranging a plurality of photoelectric conversion elements on the focal plane of the lens system along the image of the road area formed on the focal plane. Unless the general view of the object road area is heavily obscured such as by fog, the system of this invention is capable of easily detecting changes in brightness of the object road portions even at a distance of about 500 meters. Once the system is installed as described above, the traffic information in the object road area can be collected accurately by causing the electric signals emitted by the photoelectric conversion elements to be processed by the processing circuits. Since the traffic information thus collected is converted into a series of pulse signals suitable for transmission through a telephone line, it can be transmitted very easily to a remote traffic control center. Because of the high accuracy of the information produced and the great simplicity of the equipment used, this invention can be put to use with great ease.

What is claimed is:

1. A system for the collection and transmission of traffic information, which comprises:
   a lens system disposed at a position at which said lens system is angled so as to include in the focal plane thereof a road area selected for the purpose of collection of traffic information,
   a plurality of photoelectric conversion elements arranged on said focal plane of said lens system along the direction of the image of the road area formed on said focal plane,
   a plurality of differential circuits for individually differentiating electric signals issuing from said plurality of photoelectric conversion elements, and
   a plurality of comparators for individually converting differentiated signals issuing from said plurality of differential circuits into pulse signals,
   wherein said plurality of photoelectric conversion elements arranged in the image of said road area formed on the focal plane are formed in shapes successively decreased in width and length in conformity with the perspective view of the traffic lane formed on said focal plane.

2. The system according to claim 1, which includes a plurality of buffer memories for individually storing said pulse signals into which said electric signals issued from said plurality of photoelectric conversion elements have been converted and a multi-selector for successively scanning said pulse signals stored in said plurality of buffer memories and converting them into a series of pulse signals.

3. The system according to claim 2, which includes means for transmitting said series of pulse signals issuing from said multi-selector to a traffic control center via a telephone line.

4. The system according to claim 1, which includes means for the counting of the number of vehicles passing the road area, said counting means comprising means for converting the electric signal from each of the photoelectric conversion elements into a signal of differential wave form, means for converting said signal of differential wave form into a signal of differential wave form of inverted polarity, means for converting said signal of differential wave form into a signal of rectangular wave form near the zero level, means for converting said signal of differential wave form of inverted polarity into a signal of rectangular wave form near the zero level, means for subjecting said two signals of rectangular wave forms to a logical sum operation, and means for detecting the presence of time intervals greater than a fixed size between the individual rectangular waves in the signal of rectangular wave form resulting from said logical sum operation.

5. The system according to claim 1, which includes means for the measurement of speeds of vehicles passing the road area, said measuring means comprising:

a pair of photoelectric conversion elements arranged on the focal plane at given intervals along the lengthwise direction of the image of the road area;

first differential means for differentiating an electric signal issuing from the first of said pair of photoelectric conversion elements;

first comparing means for comparing a signal of differential wave form issuing from said first differential means with a fixed level not less than the level of zero and thereby converting it into a pulse signal;

second differential means for differentiating an electric signal issuing from the second of said pair of photoelectric conversion elements;

second comparing means for comparing a signal of differential wave form issuing from said second differential means with a fixed level not less than the level of zero and thereby converting it into a pulse signal;

a flipflop circuit adapted to utilize, as its setting signal, said pulse signal issuing from said first comparing means and, as its resetting signal, said pulse signal issuing from said second comparing means;

third comparing means for comparing a pulse signal issuing from said flipflop circuit with a pulse signal corresponding to the lowest vehicle speed; and means for generating a DC voltage directly proportional to the difference between the corresponding pulse widths of the two pulse signals issuing from said third comparing means.

* * * * *